United States Patent
Rudd et al.

(10) Patent No.: US 6,231,676 B1
(45) Date of Patent: May 15, 2001

(54) CLEANING PROCESS FOR DISC DRIVE COMPONENTS

(75) Inventors: Gregory Ian Rudd, Aptos; Karl Harold Scheppers, Scotts Valley, both of CA (US); Thomas Patrick McDonnell, Loveland, CO (US); Donald James MacLeod, Santa Cruz, CA (US); Paul Weidler, Felton, CA (US); Larry Liu, Winnetka, CA (US); Arnold George Slezak, Yukon, OK (US); Robin F. Dorulla, Santa Cruz, CA (US); Gregg P. Stevens, Boulder Creek, CA (US); Dirk Anthony Krieger, Woodside, CA (US); Thaveesin Vasavakul, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/237,715

(22) Filed: Jan. 26, 1999

Related U.S. Application Data

(60) Provisional application No. 60/072,652, filed on Jan. 27, 1998, and provisional application No. 60/079,886, filed on Mar. 30, 1998.

(51) Int. Cl.$^7$ ....................................................... B08B 5/00
(52) U.S. Cl. ................................ 134/1; 134/2; 134/25.4; 134/31; 134/34; 134/36; 134/37; 134/40; 134/42; 360/97.02; 360/97.03; 360/128; 360/137
(58) Field of Search ........................... 134/1, 2, 25.4, 134/31, 34, 36, 37, 40, 42; 360/97.02, 97.03, 128, 137

(56) References Cited

U.S. PATENT DOCUMENTS

| 4,028,135 | 6/1977 | Vig et al. ................................. 124/1 |
| 5,013,366 | * 5/1991 | Jackson et al. ......................... 134/1 |
| 5,599,590 | * 2/1997 | Hayashi et al. ...................... 427/448 |
| 5,833,871 | * 11/1998 | Matsushita et al. .................. 216/22 |
| 5,865,902 | * 2/1999 | Yam et al. .............................. 134/7 |
| 5,972,123 | * 10/1999 | Verhaverbeke ......................... 134/3 |
| 5,983,672 | * 11/1999 | Jinbo et al. ........................... 65/30.1 |

FOREIGN PATENT DOCUMENTS 62-040730 * 2/1987 (JP) .

* cited by examiner

Primary Examiner—Sharidan Carrillo
(74) Attorney, Agent, or Firm—Merchant & Gould P.C.

(57) ABSTRACT

A system for cleaning disc drive components includes a rotary support member for receiving an assembled disc drive component. A rotary drive motor is coupled to the rotary support member for rotating the rotary support member and disc drive motor supported thereon together at a rotation speed to impart a centrifugal force on any excess lubricant contained by the disc drive motor of sufficient magnitude to draw the excess lubricant from the disc drive motor. The system may also or alternatively include an enclosure defining an interior having an oxygen-containing environment. A support platform is disposed within the oxygen-containing environment of the interior of the enclosure, for supporting a disc drive component within the oxygen-containing environment of the enclosure, for example, after the component is removed from the rotary support member. An ozone source is disposed within the enclosure, for providing sufficient ozone in the vicinity of the disc drive component to oxidize organic material on the disc drive component and convert the organic material to water vapor and carbon dioxide. The enclosure includes a vent for venting the carbon dioxide and any remaining ozone from the enclosure.

13 Claims, 6 Drawing Sheets

CLEANING PROCESS FOR DISC DRIVE COMPONENTS

This application claims the benefit of Provisional Applications No. 60/072652, filed Jan. 27, 1998 and No. 60/079886, filed Mar. 30, 1998.

FIELD OF THE INVENTION

The present invention relates, generally to processes, apparatuses and systems for cleaning components of a disc drive device and, in preferred embodiments, to processes, apparatuses and systems employing any one or combination of ozone exposure and centrifugal force for removing contaminants, such as organic oil, from disc drive subassemblies and disc rotation motor components.

BACKGROUND OF THE INVENTION

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Conventional disc drive devices typically comprise a variety of components, including motors or actuators, electronics, recording or reading heads and one or more recording discs supported for relatively high speed rotation within a closed disc drive housing. For example, FIGS. 1 and 2 show generalized representation of portions of a conventional disc drive system, including a conventional data storage or recording disc 200 supported on a rotary spindle 210. A disc drive motor, generally represented at 212, is operatively coupled to the spindle 210, for rotation of the spindle and the disc supported thereon. A recording and/or reading head 220 is supported by an actuator arm structure 222 adjacent, and in close proximity to, the recording surface of the disc. To simplify the disclosure, FIG. 1 is shown with a single recording disc 200 having a single recording surface and a single head 220 and actuator arm 222. However, other conventional disc drive systems employ multiple discs, double-sided discs (discs with recording surfaces on both surfaces) and multiple heads and actuator arms.

In many modern disc drive systems, the actuator arm 222 forms a part of an actuator assembly that pivots about a pivot mechanism disposed in a medial portion thereof. A limited movement motor, such as a voice-coil motor (not shown), is coupled to the actuator assembly and is operated to selectively pivot the actuator arm, to selectively locate the head 220 along the radial dimension of the disc surface. In this manner, the head 220 may be located adjacent any recording position on the recording surface for recording or reading operations, as the disc 200 is rotated.

The motor 212 used for rotating the spindle 210 and disc (or stack of discs) 200 must be capable of providing relatively high speed disc rotation, sustained over a suitable period of time to allow retrieval or recordation of data on the disc(s). One suitable motor design, comprises a hydrodynamic motor structure. Other disc rotation motor designs are well known in the art and have been employed in a variety of conventional disc drive devices.

Due to the nature of various materials, coatings and components used in the manufacture or assembly of a disc drive device, organic contaminants such as oils, hydrocarbons and other contaminants, can adhere to the surfaces of such components, materials and coatings during manufacture. For example, surface chemical contaminants tend to accumulate on disc rotation motor components during manufacture and assembly, especially motor components that are designed to hold a volume of oil or other lubricating fluid, such as components used in hydrodynamic motors as referenced above.

If such chemical surface contaminants are not properly removed from the disc drive components prior to completion of assembly, the contaminants can evaporate or otherwise be expelled into the environment within the disc drive housing interior and can migrate to other components within the disc drive housing. These contaminants tend to settle on other components within the disc drive housing, such as the heads and disc recording surfaces, and can adversely affect operational performance of the device. For example, organic contaminant accumulations on the head and disc surfaces are believed to be a cause of head stiction, a condition in which the head adheres to the disc surfaces.

Indeed, surface chemical contamination has become a critical issue on the interior components of disc drives. Organic contaminants such as films of silicone oil, hydrocarbons, fatty acid esters and amides have been linked to reliability problems that have become more severe as areal density of data on the disc increases and head-disc separation decreases.

Accordingly, steps may be taken during the manufacture or assembly of the disc drive device to remove surface chemical contaminants for various components and subassemblies of the device. However, removing contaminant films from certain components and complex subassemblies has proven to be difficult, especially in the clean room environments typically used in disc drive assembly facilities, where use of solvents must be minimized. Previous attempts to address this problem involved strict environmental and process controls to avoid the accumulation of surface chemical contaminants. However, such strict controls can are difficult to monitor and maintain. Thus there is a need for processes, compatible with a clean room environment, that provide surfaces that are cleaner than those resulting from traditional solvent wiping or aqueous cleaning alone and that can clean delicate components during and after assembly.

Ozone ($O_3$) has been used for removing organic contaminants from water and for surface stripping of resist films as part of a process for manufacturing semiconductor devices. Ozone is a potent oxidizing agent that converts (burns) organic materials into water vapor and carbon dioxide. Ozone can be generated by an electric arc, a plasma source, or by short wavelength (200 nm or less) UV light. UV light generation has proven to be especially effective because the UV acts to generate ozone, excite the organic contaminants to make them more reactive with ozone and oxygen and destroy excess ozone.

SUMMARY OF THE DISCLOSURE

Therefore, to address problems as described above, regarding the presence of contaminants and excess lubricant on disc drive components, embodiments of the present invention relate to processes, apparatuses and systems for cleaning disc drive components during the manufacture and assembly of a disc drive device.

Embodiments of the present invention can provide advantages with respect to simplifying the cleaning of contaminants and excess lubricants from crevices, small spaces and otherwise hard-to-reach locations on a disc drive component.

Further embodiments of the present invention can provide advantages with respect to quickly and efficiently removing contaminants and excess lubricants.

Yet further embodiments of the present invention can provide advantages with respect to such cleaning and removing of excess lubricants without requiring labor intensive swabbing processes.

Yet further embodiments of the present invention can provide advantages with respect to setting the lubricant level within an assembled hydrodynamic motor to an appropriate level for the motor, while removing and cleaning excess lubricant from the motor components.

According to a preferred embodiment of the present invention, a process, apparatus and system for cleaning disc drive components and subassemblies employs an enclosure defining an interior having an oxygen-containing environment. A support platform is disposed within the oxygen-containing environment of the interior of the enclosure, for supporting a disc drive component within the oxygen-containing environment of the enclosure, for example, after the component is removed from the rotary support member. An ozone source is disposed within the enclosure, for providing sufficient ozone in the vicinity of the disc drive component to oxidize organic material on the disc drive component and convert the organic material to water vapor and carbon dioxide. The enclosure includes a vent for venting the exhaust gases and any remaining ozone from the enclosure According to a further preferred embodiment of the present invention, a process, apparatus and system for cleaning disc drive components employs a rotary support member for receiving a disc drive component (such as an assembled hydrodynamic motor). A rotary drive motor is coupled to the rotary support member for rotating the rotary support member and disc drive component supported thereon together at a rotation speed to impart a centrifugal force on any excess lubricant contained by the disc drive component of sufficient magnitude to draw the excess lubricant from the disc drive motor.

According to yet a further preferred embodiment of the present invention, a process and system employs an enclosure with an oxygen-containing environment, support platform, ozone source and vent, as described above and further employs a rotary support member and rotary drive for imparting centrifugal force on the disc drive motor, also as described above.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

As noted above, the present invention relates, generally to processes, apparatuses and systems for cleaning components of a disc drive device and, in preferred embodiments, to processes, apparatuses and systems employing any one or combination of ozone exposure and centrifugal force for removing contaminants, such as organic oil, from disc drive subassemblies and disc rotation motor components.

Figure 1:
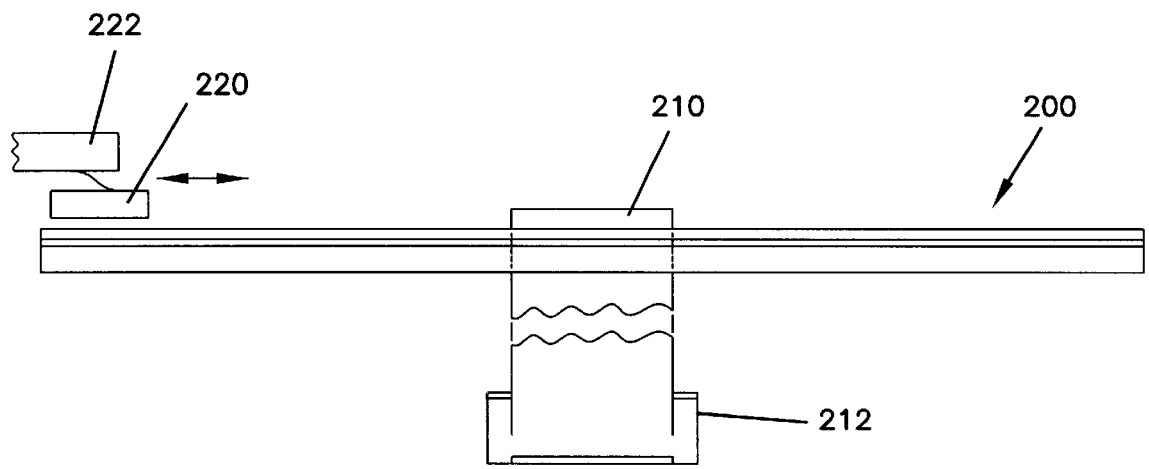
FIG. 1 is a side view of portions of a conventional disc drive system and recording disc.
Figure 2:
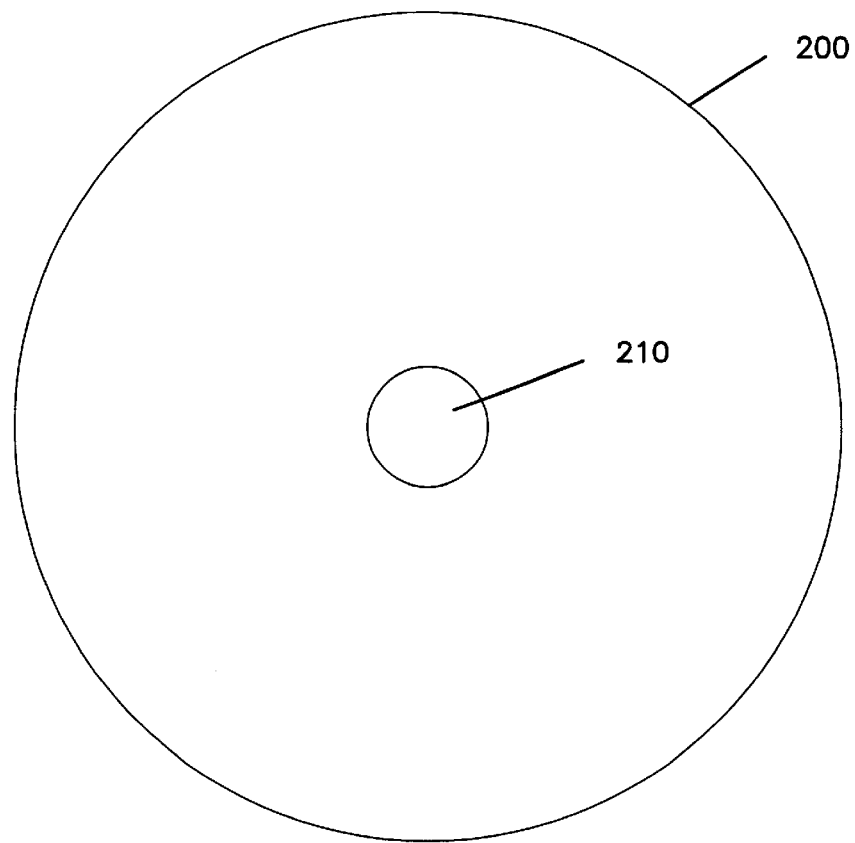
FIG. 2 is a top view of the recording disc and spindle of the system shown in FIG. 1.
Figure 3:
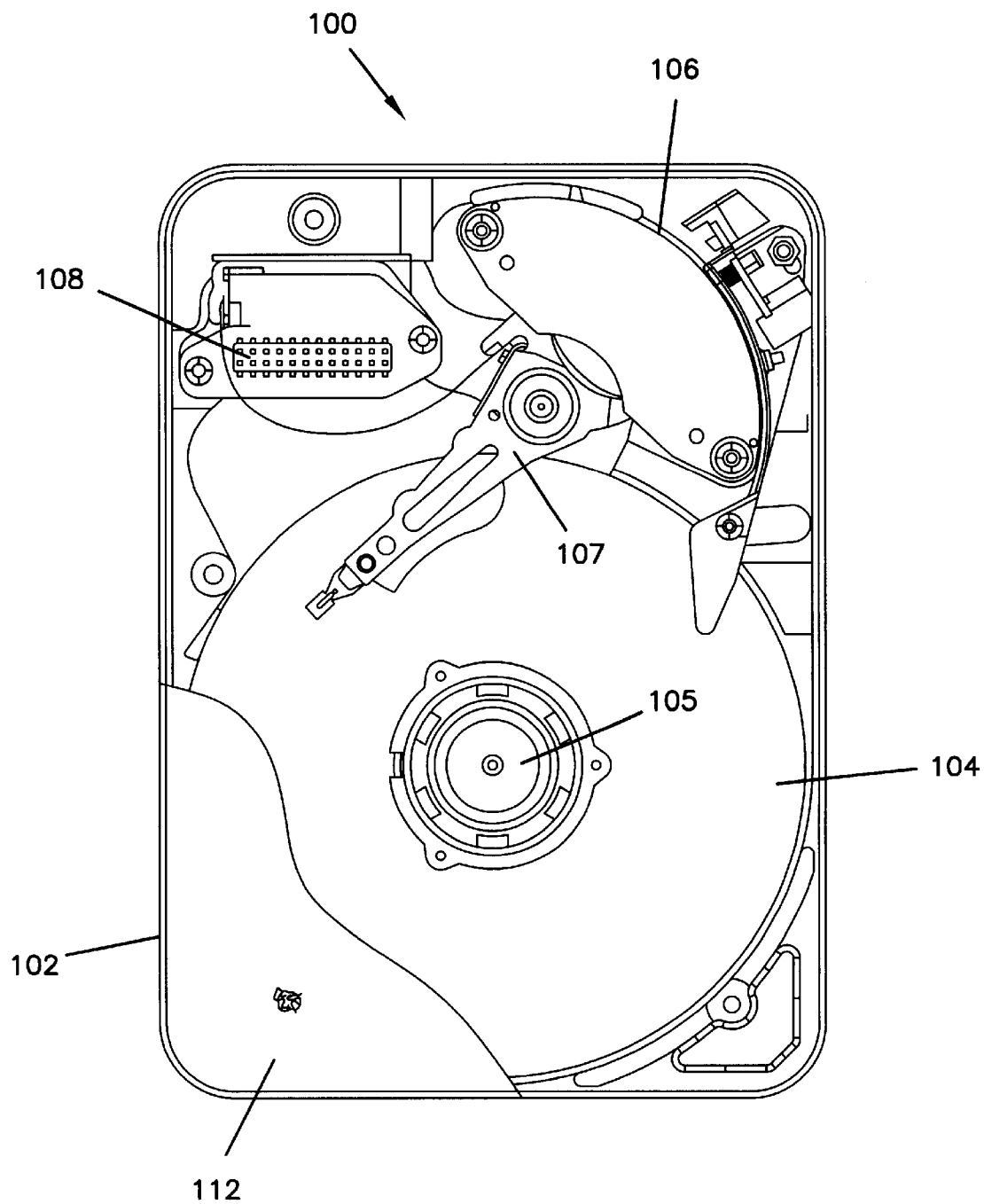
FIG. 3 is a top view of a preferred embodiment of a disc drive assembly.

While aspects of the present invention are applicable to a variety of disc drive device designs, a representative example of a disc drive device 100 to which embodiments of the present invention are applied is shown, in top view, in FIG. 3. As shown in FIG. 3, the disc drive device 100 includes a housing base 102, at least one data storage disc 104 supported on a rotary spindle hub 105, a disc rotation motor coupled to the rotary spindle hub, a head-arm actuator 106, a head-arm member 107 for supporting one or more heads adjacent the data storage disc 104 and suitable control circuitry for controlling the head, the head-arm actuator and the disc rotation motor (partially shown). The disc drive device 100 also includes a top portion 112 (shown, partially cut away to show the housing interior) which, upon completion of assembly of the device, is sealed to the housing base 102, to define a closed interior. It will be understood that details of the construction and operation of various components of the disc drive device 100 are not expressly described herein, where such details are well known to those skilled in the art.

While only one disc 104 is shown in view in the top-down view of FIG. 3, it will be understood that embodiments of the invention may employ any suitable number of discs 104, arranged in a stack and supported on the rotary spindle hub 105. For example, the rotary spindle hub may support one, two, three, four or more discs for rotation by the disc rotation motor. In one preferred embodiment, the disc rotation motor comprises a hydrodynamic motor encased by the spindled hub and mounted to the housing base 102, for example, as described in further detail in co-pending U.S. patent application Ser. No. 09/247,793 titled "Hydrodynamic Motor In A Head Disc Assembly." In other embodiments, the disc rotation motor may comprise other suitable motor configurations.

Disc drive components, such as referenced above, are assembled within the disc drive housing enclosure during manufacture. As described above, some disc drive components, such as the spindle and disc rotation motor components, tend to become contaminated during manufacture. More particularly, such components tend to collect excess oils, adhesives and particulate matter on external surfaces, in grooves, crevices and the like. Some components, such as hydrodynamic motors, are injected with a volume of lubricant fluid and, as a result of the injection process, tend to expel excess lubricant. Contaminants that remain on those parts (or are expelled from hydrodynamic motor components) after completion of assembly of the disc drive device become sealed inside the disc drive housing enclosure during manufacture and assembly. As described above, it is believed that components having such contaminants accumulations have been the source of disc drive reliability problems. Such contaminates can evaporate and be conveyed in a gaseous form to other components within the disc drive housing and can collect, for example, on the heads or disc surfaces.

Figure 4:
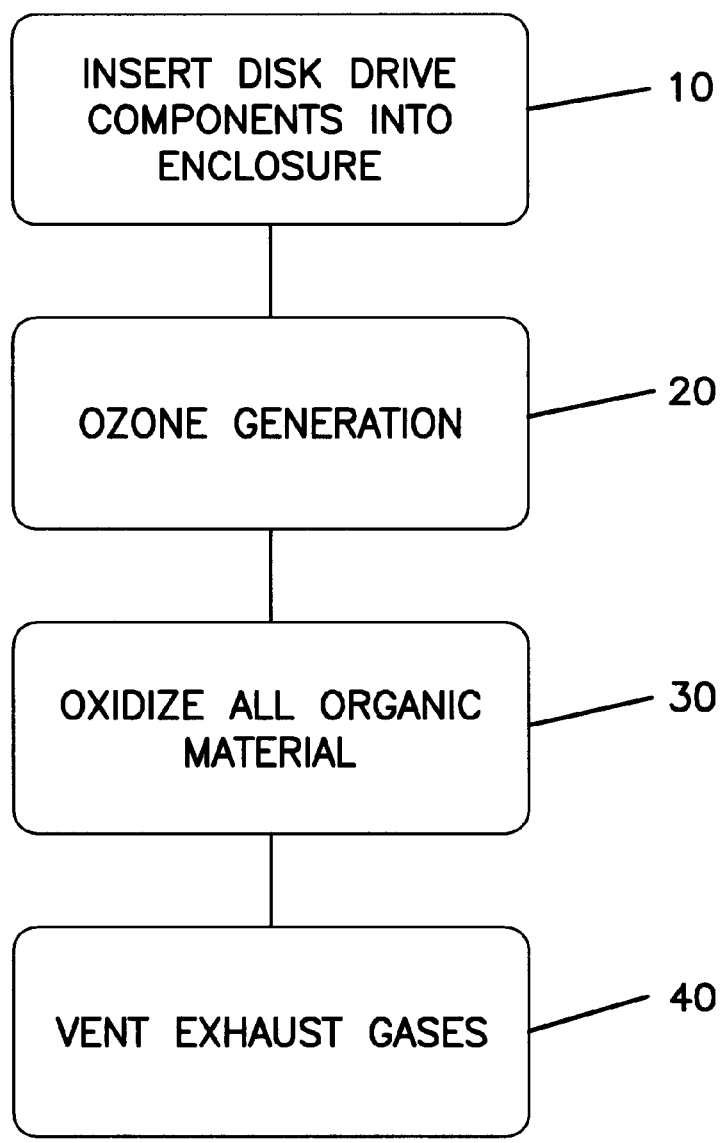
FIG. 4 is a flow chart of a preferred embodiment of the disc drive component cleaning method.

The instant embodiments are more specifically directed to a method, apparatus and system for cleaning disc drive components and subassemblies during manufacture and/or assembly, so as to minimize surface chemical contamination. A flow diagram representation of an example of a disc drive cleaning process according to first, second and third preferred embodiments of the present invention is shown in FIG. 4. According to these preferred embodiments, the present inventors have recognized that ozone can be effectively used to remove various types of organic chemical surface contaminates that are believed to be a primary cause of migratory contamination within the disc drive housing.

The illustrated example process of FIG. 4 involves introducing a disc drive component into a $O_3$ oven 10, generating ozone 20, oxidizing substantially all organic material on the surface of the component 30 and venting exhaust gases outside of the container 40. Once the organic material has been oxidized and removed from the component, the component may be assembled within the disc drive housing, for example, by mounting the component on a housing base 102, within a clean-room environment.

Figure 5:
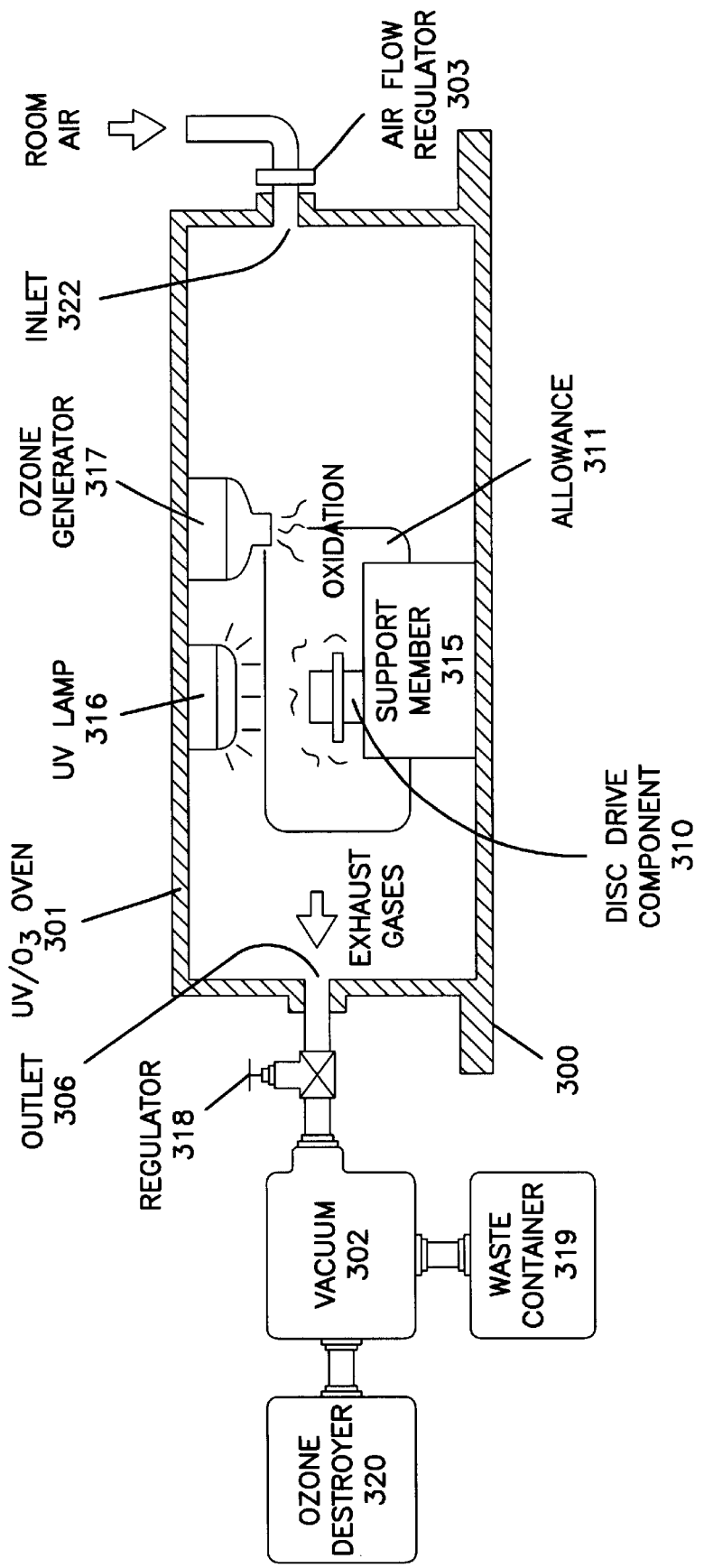
FIG. 5 is a schematic diagram of an ozone cleaning apparatus for disc drive components, according to a preferred embodiment of the present invention.

FIG. 5 is a generalized diagram of an example embodiment of an apparatus for cleaning disc drive components in accordance with an ozone cleaning process, such as described above with respect to FIG. 4. As shown in FIG. 5, the disc drive component cleaning apparatus 300 includes an $O_3$ oven 301, having an oven enclosure housing defining an interior chamber for receiving a disc drive component or subassembly 310.

The oven housing includes an outlet 306, through which exhaust gases (as described below) are expelled from the oven chamber. A vacuum source 302, such as a vacuum pump, is coupled in flow communication, through an air flow regulator 318, with the outlet 306 and with a waste container 319 and an ozone destroyer 320. The vacuum source 302 provides a vacuum pressure for drawing gas out of the oven housing and for disposing waste material in the waste container 319 and ozone in the ozone destroyer 320.

The oven housing in FIG. 5 also includes an inlet opening 322, through which atmospheric air (or other suitable gas) may be drawn into the housing chamber, through an air flow regulator 303. In preferred embodiments, the inlet opening is coupled to a source of oxygen-containing gas (not shown). A component support member 315 is centrally located within the oven housing chamber. In the illustrated embodiment, the support member 315 defines a flat surface on which the disc drive component 310 rests. In other embodiments, the support member may comprise any suitable supporting structure, platform, clip, or the like, for holding a disc drive component or subassembly.

The oven housing additionally contains a ultra-violet UV radiation source 316 located in close proximity to the surface of the disc drive component 310, for directing UV wherein the surface of the disc drive component 310 is in the line of sight of the UV light source 316.

With reference to FIGS. 4 and 5, at step 10, a disc drive component 310 is introduced to the UV/$O_3$ oven 301. In one embodiment, the UV/$O_3$ oven 301 is an oxygen-filled enclosure with an allowance (or opening) 311 made for the introduction of a disc drive subassembly. The allowance 311 is located within one of the oven housing walls and may be sealed by a panel (or door), for example, coupled to the oven housing over the allowance.

A process according to a second preferred embodiment of the present invention employs an oven housing as described above with reference to FIG. 5, however, with the housing containing an ozone generator 317, for example, a corona discharge, instead of a UV light source 316. A third preferred embodiment employs a housing as described above, containing both the UV light source 316 and the ozone generator 317.

In operation, the disc drive component 310 is inserted into the UV/$O_3$ oven 301 and placed on the component support member 315. The allowance 311 is then sealed by a panel to create, in conjunction with the walls of the enclosure, an oxygen containing environment within the UV/$O_3$ oven 301.

At step 20, ozone is created. In the first embodiment, ozone is created by the use of a high intensity short wavelength UV light source 316. The UV light source 316 is a mercury vapor lamp or other light source capable of generating UV radiation of wavelength about 185 nM. The UV rays from the mercury vapor lamp, create ozone when exposed to the oxygen contained atmosphere. In the second embodiment ozone is created by using an electric ozone generator 317, such as corona discharge instead of a UV light source 316. The ozone generator 317 is electrically powered and ozone is generated when an oxygen-contained gas is fed into the generator. In a third preferred embodiment ozone is created by the use of both a high intensity short wavelength UV light source 316 and an ozone generator 317, as described above.

At step 30, by the action of the ozone created in step 20, organic material on the surface of the disc drive component 310 becomes oxidized. According to preferred embodiments, oxidation occurs when ozone, an oxidizing agent, converts (burns) organic materials into water vapor and carbon dioxide. The carbon dioxide, along with excess ozone, becomes exhaust gas.

At step 40, the exhaust gas is then vented outside the O3 oven 301 to the waste container 319 or ozone destroyer 320. The vacuum source 302 evacuates the exhaust gases from the oven 301. The regulator 318 is used to control the rate of vacuum airflow. The regulator 318 may comprise, for example, a valve connected, through a conduit, between the vacuum source 302 and the UV/$O_3$ oven 301. Room air will then flow into the O3 oven 301, to equalize the internal pressure, through inlet opening 322. An airflow regulator 303 is coupled, in flow communication, to the inlet opening, and is preferably a one-way valve which allows room air to enter the enclosure, but does not allow exhaust gases to escape through the opening 322, to the atmosphere. In preferred embodiments, the gases evacuated through the exhaust opening 302 will be stored in a sealed container 319 and safely disposed. In further preferred embodiments, the exhaust gases are not contained in a sealed container 319, but, instead, are evacuated into an ozone destroyer 320.

In further preferred embodiments, additional cleaning steps can be performed. For instance, oil can be wiped off the surface of the disc drive component 310 using a saturated wipe material, such as a suitable, lint-free wipe cloth or texwipe, then wiped as clean as possible with a dry wipe material (or texwipe). Multiple wiping steps may be performed with fresh wipe materials for each wiping step. In preferred embodiments, four wiping steps are performed, following one or more ozone exposure procedures, as described above.

Therefore, based on the above-discussed embodiments, a preferred method for cleaning disc drive components involves placing a disc drive component in an oxygen-containing (or air) enclosure. In addition, preferred methods comprise creating ozone by illuminating a mercury vapor lamp and/or activating an electric ozone generator, located within the enclosure. Preferred methods further comprise oxidizing organic material on the component, which creates an exhaust gas containing carbon dioxide. Preferred methods further comprise venting the exhaust gas and excess ozone to the outside of the container or to an ozone destroyer.

While the above-described processes have been effective in removing a substantial amount of chemical surface contaminants on disc drive components, further embodiments employ yet additional or alternative cleaning steps for removing contaminants from certain components, such as disc rotation motor components.

During the assembly process, various components, such as the rotor of a hydrodynamic disc rotation motor, are filled with or otherwise provided with a lubricating fluid, such as an oil. The amount of oil required by the rotor to provide a bearing seal is specific to each individual motor. Typically, some oil remains in locations that are difficult to clean.

According to a fourth embodiment of the present invention, a centrifugal force is provided on the component (e.g., rotor) for cleaning oil from difficult-to-reach locations on the component. In addition, for hydrodynamic motor's components, the centrifugal force also sets the oil seal specific to the component. Thus, for example, by imparting a centrifugal force on the whole (assembled) motor, as a unit, the hub and shaft of the motor and spindle can be cleaned of oil and the bearing oil seal can be readily set for the specific motor.

In one aspect of the fourth embodiment, centrifugal cleaning of a disc drive component may be performed in combination with any of the processes described above with respect to the first, second and third embodiment. Thus, for example, a process according to the fourth embodiment may involve process steps for effecting centrifugal cleaning of a component (such as a hydrodynamic motor) prior to steps associated with ozone cleaning, as described above. In further embodiments, process steps for centrifugal cleaning may be performed after process steps for ozone cleaning are performed. Alternatively, a further process according to the fourth embodiment may involve steps associated with centrifugal cleaning without ozone cleaning steps.

Figure 6:
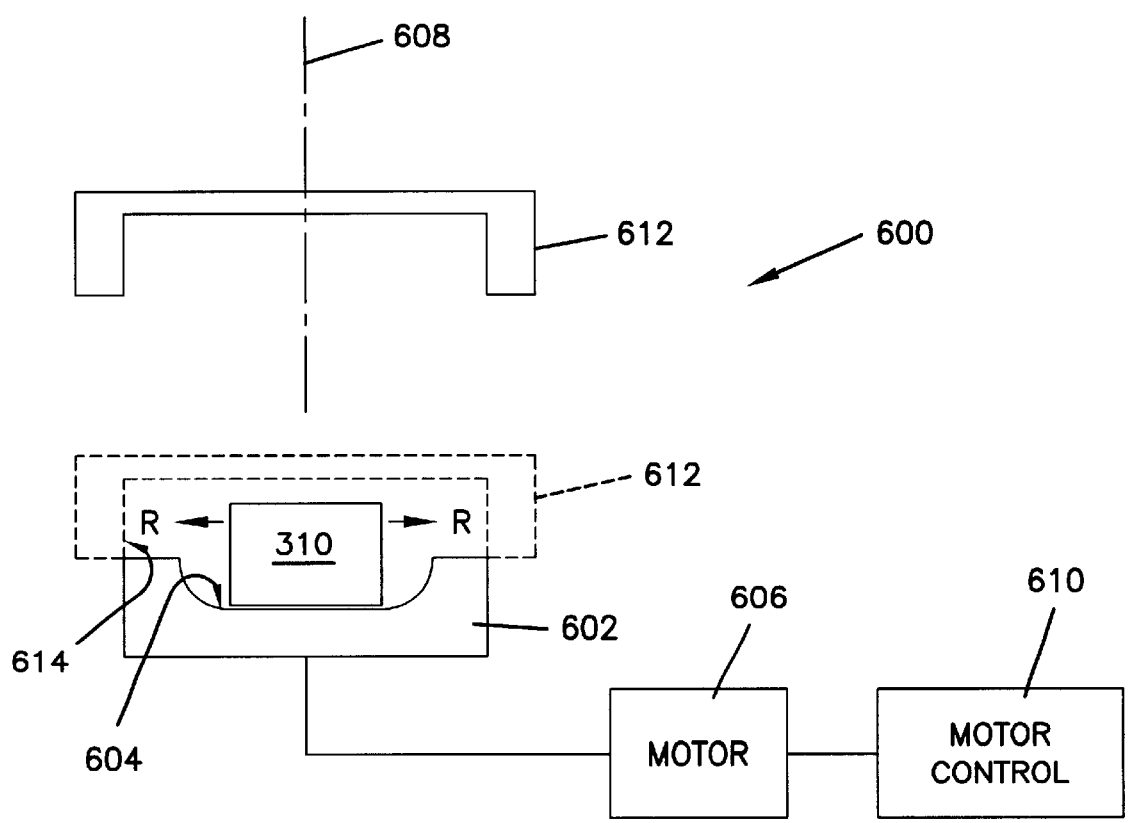
FIG. 6 is a block diagram representation of a centrifugal cleaning system employed with an embodiment of the present invention.
Figure 7:
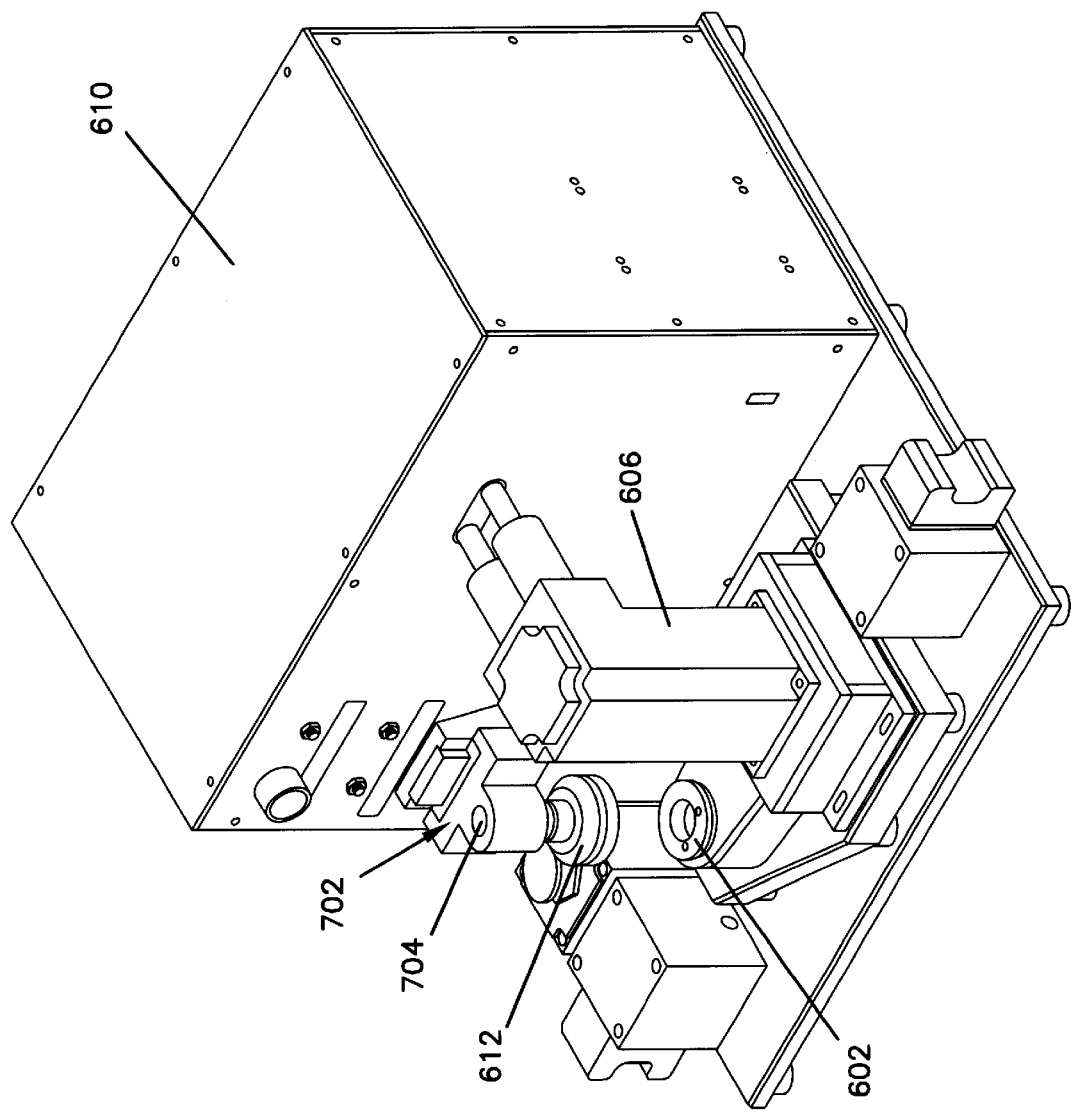
FIG. 7 is a perspective view of a centrifugal cleaning apparatus employed with an embodiment of the present invention.

A centrifugal cleaning process, according to the fourth embodiment, involves, generally, supporting a component (such as a hydrodynamic motor) on a rotary support member and rotating the rotary support member with a motor at a speed to impart a centrifugal force on the component of sufficient magnitude to cause excess oil and other contaminants to be flung radially outward from the component. A generalized block diagram of a centrifugal cleaning system 600 is shown in FIG. 6. FIG. 7 shows a perspective view of a centrifugal cleaning apparatus, in accordance with the block diagram representation of FIG. 6. Components in FIG. 7 which correspond to those of FIG. 6 are correspondingly numbered.

Referring to FIG. 6, the centrifugal cleaning system 600 includes a rotary support member 602 having a surface or receptacle 604 for receiving and supporting an assembled hydrodynamic motor (represented as component 310 in FIG. 6) during relatively high speed rotation. The system 600 also includes a motor 606 coupled to the support member 602, for driving the support member in a rotary motion about an axis of rotation, represented by the broken line 608 in FIG. 6. Suitable control electronics 610 are coupled to the motor 606, for controlling the rotation speed imparted by the motor.

In operation, an assembled motor 310 is received in the receptacle 604 of the rotary support member 602. The motor 606 is then operated, under the control of the motor control electronics 610, to rotate the support member 602 (with the motor 310 supported thereon) at a rotation speed sufficient to impart a centrifugal force on the motor 310 (and any oil on or in the motor) such that excess oil is flung radially outward, with respect to the axis of rotation 608. Rotation speeds of 5,000 rpms to 20,000 rpms may be employed and speeds from 9,000 to 11,000 are preferred. Once a sufficient amount of oil has been removed from the motor components by the centrifugal force, the motor 606 may be stopped or slowed to allow removal of the centrifugally cleaned motor 310 from the support member 602. As described above, the motor 310 may then be assembled into the housing base without further cleaning steps or, alternatively, may be subjected to further cleaning steps as described with respect to FIGS. 2–5.

In preferred embodiments, the system 600 further includes an oil catching member 612 for receiving at least some of the oil radially flung from the motor 310. In one embodiment, the oil catching member comprises a cup-shaped member having a generally cylindrical wall 614 which may be moved into a position (shown in broken lines in FIG. 6), such that the wall 614 intersects the radial direction R of flight of oil flung from the motor 310, during rotation of the support member 602. In further preferred embodiments, the oil catching member may be coupled to a vacuum tube and vacuum source (not shown), for suctioning off material received by the member during centrifugal cleaning.

The oil catching member 612 is preferably coupled to a suitable mechanism for providing selective movement of the member into and out of an oil catching position. In the FIG. 7 embodiment, the mechanism comprises a rail and slider, generally represented at 702 and 704, respectively, wherein the slider 702 is coupled to the oil catching member 612 and is slidable along the rail 704 toward and away from the support member 602. However, other embodiments may employ other suitable mechanisms for moving the oil catching member 612 to and from an oil catching position, as would be recognized by those skilled in the art, including, but not limited to pivotal arm or hinge structures for pivoting the oil catcher member to and from an oil catching position.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the details of a particular step may vary depending on the particular embodiment used to clean the components in step 20, while maintaining substantially the same functionality without department from the scope and spirit of the present invention. In addition, although the preferred embodiment described herein is directed to a method for cleaning disc drive components, it will be appreciated by those skilled in the art that the teachings of the present invention can be applied to other systems without departing from the scope and spirit of the present invention.

What is claimed is:

1. A method for cleaning disc drive components having excess lubricant comprising the sequential steps of:
   receiving the disc drive component on a rotary support member;
   rotating the rotary support member and disc drive component together at a rotation speed of 5,000 to 20,000 rpm to impart a centrifugal force on the disc drive component to draw the excess lubricant off of the disc drive component;
   receiving the disc drive component into an oxygen-containing enclosure;
   exposing the disc drive component within the oxygen-containing enclosure with ozone to oxidize organic materal on the disc drive component and convert the organic material to water vapor and carbon dioxide; and
   venting the carbon dioxide and any remaining ozone from the enclosure.

2. A method as recited in claim 1, wherein the step of exposing comprises steps of:
   generatingg ultra-violet (UV) radiation in the oxygen-containing enclosure;
   reacting oxygen in said enclosure with the UV radiation to create ozone; and
   exposing a surface of the disc drive component with said ozone.

3. A method as recited in claim 1, wherein the step of venting comprises coupling a vacuum source to the enclosure.

4. A method as recited in claim 1, wherein the step of exposing comprises generating ozone in said oxygen-containing enclosure with an electric ozone generator.

5. A method as recited in claim 2, wherein the step of generating UV radiation comprises energizing a mercury lamp.

6. A method as recited in claim 2, wherein the step of exposing further comprises generating ozone in said oxygen-containing enclosure with an electric ozone generator.

7. A method for cleaning disc drive components having excess lubricant comprising the sequential steps of;
   receiving the disc drive component into an oxygen-containing enclosure;
   exposing the disc drive component within the oxygen-containing enclosure with ozone to oxidize organic material on the disc drive component and convert the organic material to water vapor and carbon dioxide;
   venting the carbon dioxide and any remaining ozone from the enclosure;
   receiving the disc drive component on a rotary support member; and
   rotating the rotary support member and disc drive component together at a rotation speed of 5,000 to 20,000 rpm to impart a centrifugal force on the disc drive component to draw the excess lubricant off of the disc drive component.

8. A method as recited in claim 7, further comprising steps of disposing a lubricant-catching member adjacent the disc drive component received on the rotary support member and receiving said excess lubricant drawn off of the disc drive component with the lubricant-catching member, while the rotary support member and disc drive component are rotated.

9. A method as recited in claim 7, wherein the step of exposing comprises steps of:
   generating ultra-violet (UV) radiation in the oxygen-containing enclosure;
   reacting oxygen in said enclosure with the UV radiation to create ozone: and
   exposing a surface of the disc drive component with said ozone.

10. A method as recited in claim 7, wherein the step of venting comprises coupling a vacuum source to the enclosure.

11. A method as recited in claim 7, wherein the step of exposing comprises generating ozone in said oxygen-containing enclosure with an electric ozone generator.

12. A method as recited in claim 9, wherein the step of generating UV radiation comprises energizing a mercury lamp.

13. A method as recited in claim 9, wherein the step of exposing further comprises generating ozone in said oxygen-containing enclosure with an electric ozone generator.

* * * * *

UNITED STATES PATENT AND TRADEMARK OFFICE
CERTIFICATE OF CORRECTION

PATENT NO. : 6,231,676 B1
DATED : May 15, 2001
INVENTOR(S) : Rudd et al.

It is certified that error appears in the above-identified patent and that said Letters Patent is hereby corrected as shown below:

Column 2,
Line 29, "areal" should read -- area --
Line 43, delete the word "can" after the word "controls"

Column 3,
Line 34, insert a -- . -- after the word "enclosure"

Column 5,
Line 5, "contaminates" should read -- contaminants --
Line 19, "contaminates" should read -- contaminants --
Line 22, "a" should read -- an --
Line 60, "a" should read -- an --

Column 6,
Line 42, "03" should read -- $O_3$ --
Line 49, "03" should read -- $O_3$ --

Column 9, claim 2,
Line 27, "generatingg" should be -- generating --

Column 9, claim 7,
Line 48, ";" should read -- : --.

Column 10, claim 9,
Line 30, ":" should read -- ; --

Signed and Sealed this

Nineteenth Day of March, 2002

Attest:

JAMES E. ROGAN
Attesting Officer
Director of the United States Patent and Trademark Office